United States Patent
Goren et al.

(10) Patent No.: US 9,435,597 B2
(45) Date of Patent: Sep. 6, 2016

(54) METHODS AND SYSTEM FOR CONTROLLING THE USE OF FIREARMS

(71) Applicants: David Goren, Irvine, CA (US); James Peterson, San Juan Capistrano, CA (US)

(72) Inventors: David Goren, Irvine, CA (US); James Peterson, San Juan Capistrano, CA (US)

(*) Notice: Subject to any disclaimer, the term of this patent is extended or adjusted under 35 U.S.C. 154(b) by 0 days.

(21) Appl. No.: 14/664,671

(22) Filed: Mar. 20, 2015

(65) Prior Publication Data

US 2015/0198399 A1   Jul. 16, 2015

Related U.S. Application Data

(63) Continuation of application No. 14/180,270, filed on Feb. 13, 2014, now abandoned, which is a continuation of application No. 14/134,963, filed on Dec. 19, 2013, now abandoned.

(60) Provisional application No. 61/745,173, filed on Dec. 21, 2012.

(51) Int. Cl.
*F41A 17/00* (2006.01)
*F41A 17/66* (2006.01)
*F41A 17/06* (2006.01)

(52) U.S. Cl.
CPC ............ *F41A 17/063* (2013.01); *F41A 17/066* (2013.01)

(58) Field of Classification Search
CPC .... F41A 17/06; F41A 17/063; F41A 17/066; F41A 17/08
USPC ........... 42/70.01, 70.04, 70.05, 70.06, 70.08, 42/70.09, 70.11
See application file for complete search history.

(56) References Cited

U.S. PATENT DOCUMENTS

| | | |
|---|---|---|
| 5,603,180 A | 2/1997 | Houze |
| 5,896,691 A | 4/1999 | Kaminski et al. |
| 6,201,495 B1 | 3/2001 | Lemelson et al. |
| 6,223,461 B1 | 5/2001 | Mardirossian |
| 6,283,034 B1 | 9/2001 | Miles, Jr. |

(Continued)

*Primary Examiner* — Bret Hayes
(74) *Attorney, Agent, or Firm* — Knobbe, Martens, Olson & Bear, LLP

(57) ABSTRACT

According to certain aspects, a system for controlling use of firearms can include a circuitry coupled to a firearm and in communication with a Global Positioning System (GPS) unit. The circuitry may be configured to: determine, using the GPS unit, coordinates of a current location of the firearm; transmit the coordinates of the current location of the firearm to a remote server, wherein the remote server comprises a database including a plurality of coordinates associated with a plurality of locations at which the firearm should be enabled or disabled; receive from the remote server information relating to whether the firearm should be disabled at the coordinates of the current location of the firearm; and in response to determining that the firearm should be disabled based on the information from the remote server, initiate disabling of the firearm.

16 Claims, 3 Drawing Sheets

(56) References Cited

U.S. PATENT DOCUMENTS

| | | |
|---|---|---|
| 6,314,671 B1 | 11/2001 | Gering |
| 6,415,542 B1 | 7/2002 | Bates et al. |
| 6,977,593 B2 | 12/2005 | Schmedemann et al. |
| 2004/0099134 A1 | 5/2004 | Gotfried |
| 2005/0066567 A1 | 3/2005 | Newkirk et al. |
| 2007/0271830 A1* | 11/2007 | Holt ..................... F41A 17/066 42/70.01 |
| 2008/0039962 A1 | 2/2008 | McRae |
| 2009/0064557 A1 | 3/2009 | Hughes et al. |
| 2011/0030262 A1 | 2/2011 | O'Shaughnessy et al. |
| 2011/0056108 A1* | 3/2011 | McCord ................ F41A 17/066 42/70.01 |
| 2011/0162514 A1* | 7/2011 | Osborne ............... F41A 17/063 89/27.12 |
| 2012/0151814 A1 | 6/2012 | Dietel |
| 2012/0180357 A1 | 7/2012 | Dietel et al. |
| 2013/0318847 A1 | 12/2013 | Kelly |
| 2014/0083318 A1 | 3/2014 | Templ et al. |
| 2014/0230296 A1* | 8/2014 | Kuparinen ............ F41A 17/063 42/1.01 |

* cited by examiner

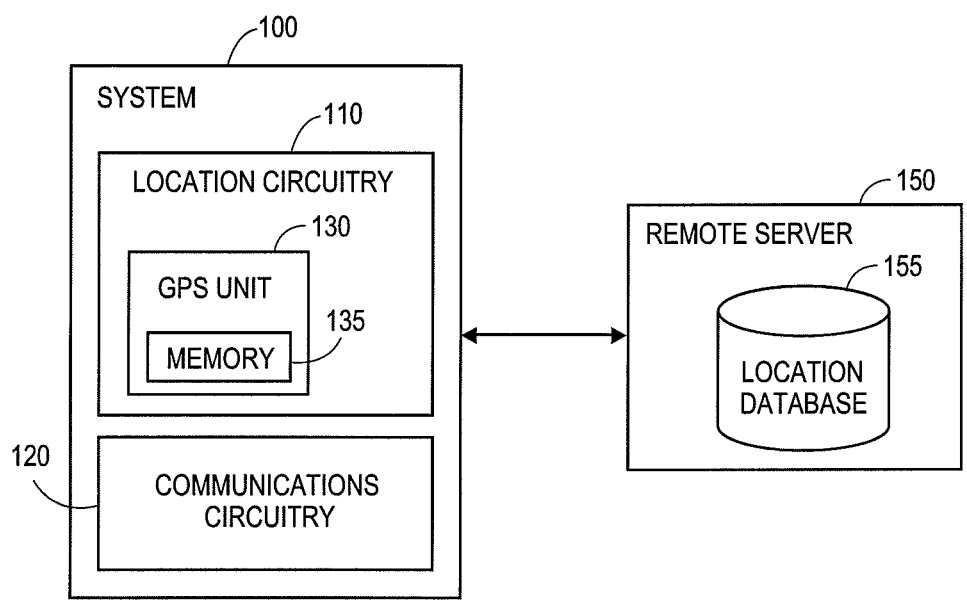
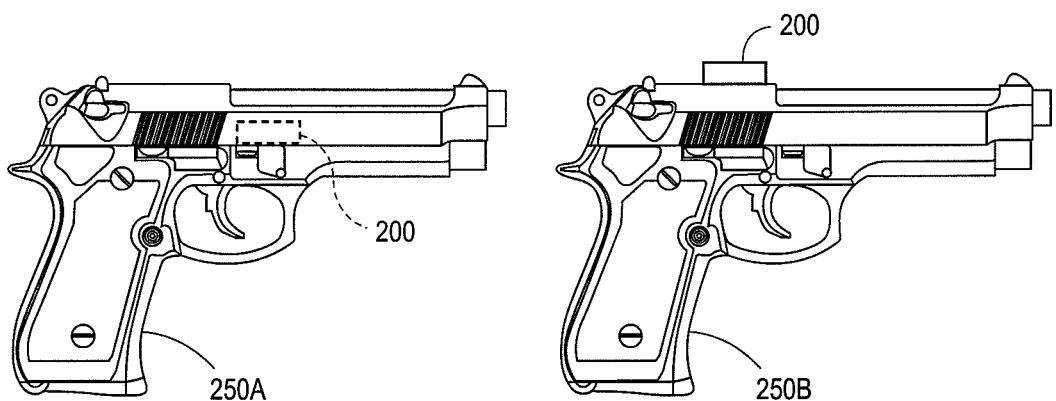
FIG. 2A          FIG. 2B

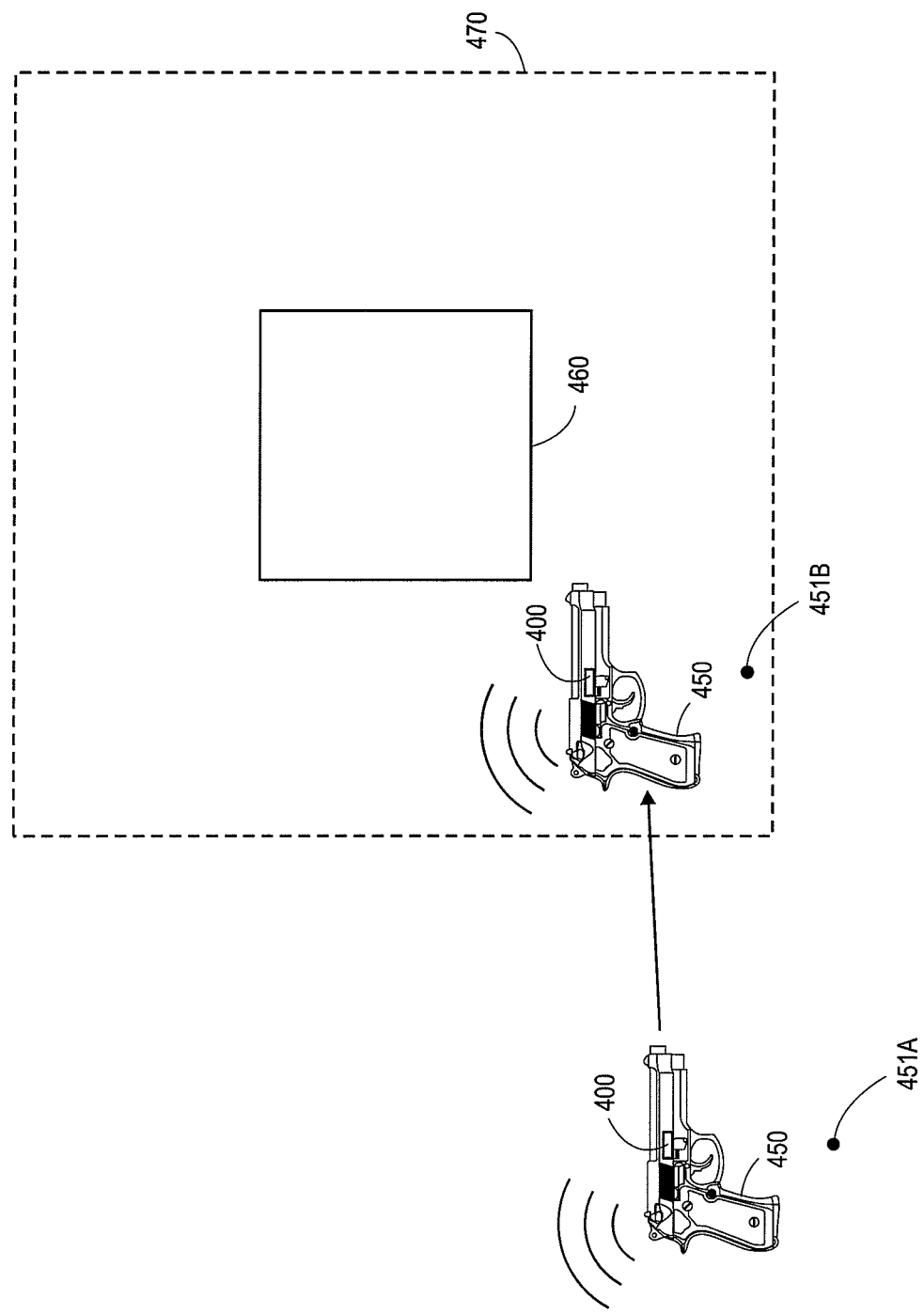

METHODS AND SYSTEM FOR CONTROLLING THE USE OF FIREARMS

INCORPORATION BY REFERENCE TO ANY PRIORITY APPLICATIONS

Any and all applications for which a foreign or domestic priority claim is identified in the Application Data Sheet, or any correction thereto, are hereby incorporated by reference into this application under 37 CFR 1.57.

FIELD OF THE INVENTION

This invention relates to methods and system for controlling the use of firearms.

SUMMARY

According to some embodiments, a system for controlling use of firearms comprises: location circuitry configured to determine a location of a firearm; and communications circuitry configured to: communicate information relating to the location of the firearm to a remote server, wherein the remote server comprises information relating to one or more locations at which the firearm should be disabled; determine whether the location of the firearm is a location at which the firearm should be disabled; and in response to determining that the location of the firearm is a location at which the firearm should be disabled, disable the firearm from operating.

According to certain embodiments, a method of controlling use of firearms comprises: determining a location of a firearm using location circuitry; communicating information relating to the location of the firearm to a remote server, using communications circuitry, wherein the remote server comprises information relating to one or more locations at which the firearm should be disabled; determining, using the communications circuitry, whether the location of the firearm is a location at which the firearm should be disabled; and in response to determining that the location of the firearm is a location at which the firearm should be disabled, disabling the firearm from operating.

BRIEF DESCRIPTION OF THE DRAWINGS

FIG. 1 illustrates a system for controlling the use of firearms based on location of a firearm.

FIGS. 2A and 2B illustrate different embodiments of a firearm that includes a system for controlling the use of firearms.

FIG. 4 illustrates a diagram of an electronic fence for controlling the use of a firearm, according to certain embodiments.

DETAILED DESCRIPTION

Figure 3:
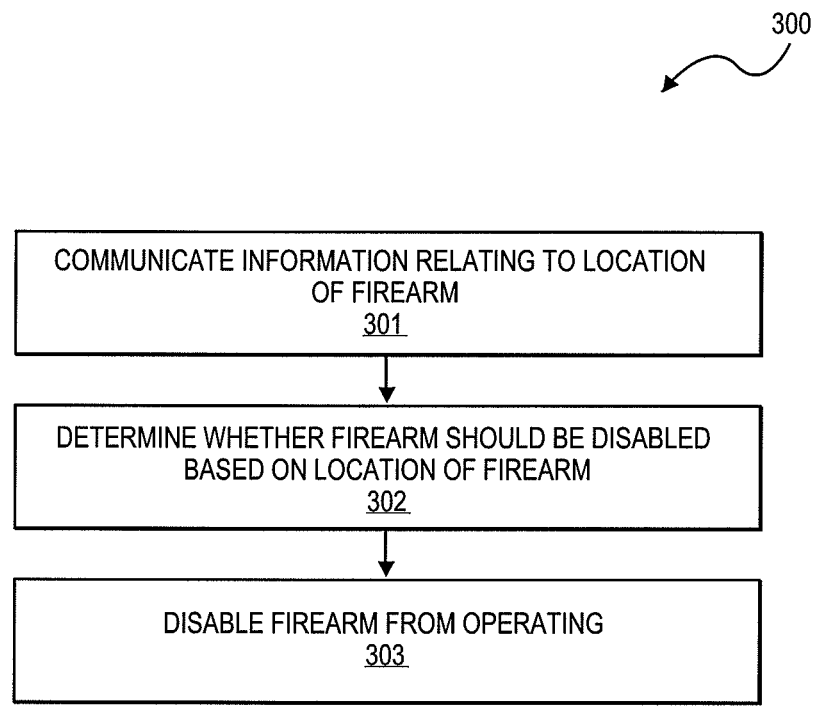
FIG. 3 illustrates a flowchart of a routine for controlling the use of a firearm, according to certain embodiments.

The disclosure provided in the following pages describes examples of some embodiments of the invention. The designs, figures, and description are non-limiting examples of some embodiments of the invention. Other embodiments of the system may or may not include the features disclosed herein. Moreover, disclosed advantages and benefits may apply to only some embodiments of the invention, and should not be used to limit the scope of the invention.

Many gun-related deaths occur because of non-owner use of the guns including use of stolen weapons and improper or accidental use by family members. For example, firearms in homes are significantly more likely to kill a family member than an intruder. Furthermore, many handguns and hunting rifles are often left unlocked in homes. Thus there is clearly a need for firearms which can only be armed for use by authorized users.

Several attempts have been made over the years to provide weapons which can be disarmed, such that they cannot function in the hands of unauthorized users, by the addition of locking/keying technology, but these have generally not proved successful. Firearms with such systems are typically more heavy and bulky, less reliable, and more expensive. Furthermore, the inconvenience of arming and disarming such guns tends to discourage regular use of the disarming system.

In one embodiment of the invention, a firearm comprises at least one or the following two forms of electronic identification: 1) location circuitry that determines the location of the firearm, and 2) communications circuitry that communicates location information and any other preselected information associated with the firearm with one or more remote servers.

In other embodiments, both forms of electronic identification are used. As a result, in one embodiment, the invention has two redundant systems, that can be used separately, or in combination, to control the operation of the firearm.

The Location Circuitry

The location circuitry and/or the communications circuitry, in one embodiment, communicate with the arming or trigger operation of the firearm and have the ability to disable the same. In another embodiment, the location circuitry and/or communication circuitry communicate with the loading mechanism or magazine of a firearm and have the ability to disable the same.

Based on preselected conditions, the firearm can be disabled remotely as it gets close to preselected locations including public places such as malls, schools etc. The firearm can also be disabled remotely if lost or stolen or for any other reason.

In one embodiment, the location circuitry comprises a Global Positioning System (GPS) unit with internal memory. The internal memory identifies locations where the firearm may be used, or alternatively where the firearm may not be used. Accordingly, the location circuitry can be used to create an electronic fence around particular locations such as public locations or areas where hunting and shooting should not occur.

In other embodiments, location information is obtained by triangulation from multiple cell towers or Wi-Fi routers. This approach may be used separately, or combined with the GPS data. In other embodiments, the location of the mobile device is determined by local wireless networks such as radio frequency identification detectors, Bluetooth® emitters (the Bluetooth® standard is a wireless Technology standard for exchanging data over short distances), proximity detectors, infrared detectors, movement detectors, and the like.

The Communications Circuitry

Focusing now on the communications circuitry, with the communication circuitry, the location of the firearm can be monitored remotely with a remote server. The remote server comprises memory that identifies locations where the firearm may be used, or alternatively where the firearm may not be used. Accordingly, the communication circuitry can also be used to create an electronic fence that disables the firearm and/or sends alarming or other data signals to police or other preselected responders around particular locations such as public locations or areas where hunting and shooting should not occur.

Furthermore, the remote server can be quickly updated to address new situations and thus, disable the firearm as desired. For example, the remote server can disable the firearm in the event the firearm is reported as lost or stolen.

In yet another embodiment, the communications circuitry can notify the remote server when the firearm has moved outside a desired area. Alternatively, the remote server can obtain the location of the firearm from the communications circuitry and determine when the firearm has moved outside a desired area. In response, the remote server and/or the communications circuitry disable the use of the firearm and send a notification to the proper authorities regarding the location of the firearm.

For example, assume that a firearm used at a training facility, is moved outside the training facility area. In response, the communications circuitry and/or remote server can disable the firearm and/or generate a notification to the training facility personnel, or other authorities, that the firearm has been removed from the training facility area. In particular, in one version, the system defines a distance boundary around the training facility. When the firearm is taken beyond the distance boundary, the communications circuitry and/or remote server can disable the firearm and/or generate the notification.

In another example, assume that a firearm located at a home is taken outside the home without authorization. In response, the communications circuitry and/or remote server disable the firearm and notify the owner, or other authorities, that the firearm has been removed from the home.

In still another embodiment, the communications circuitry can communicate with the remote server when the firearm has entered into an undesired area. Alternatively, the remote server can obtain the location of the firearm from the communications circuitry and determine when the firearm has moved within the undesired area. In response, the firearm is disabled and/or the owner, authorized user, or other authorities, are notified about the location of the firearm.

For example, assume that a firearm has been taken to a public location. In response, the communications circuitry and/or remote server disable the firearm and/or notify the owner, or other authorities, that the firearm is located at the public location. In one version, the system defines an outside perimeter around the public location, when the firearm crosses the outside perimeter, the communications circuitry and/or remote server disable the firearm and/or notify the owner, or other authorities, that the firearm is located near the public location Biometric Identification System Moreover, each firearm can have a biometric identification system such as a fingerprint identifier, palm-print identifier, retinal identification, or the like. The biometric identification system is connected to the trigger or loading mechanism of the firearm and will disable it unless its registered owner or authorized registered user is identified prior to each use or at any pre-selected intervals such as time intervals or number of shots.

Bluetooth® Pairing

In yet another embodiment, the firearm is paired with a Bluetooth® device or similar device associated with the firearm's registered owner or user, including a chip implanted in the body of the authorized user of the firearm. Such pairing can control the firearm according to pre-selected conditions. For example, when the firearm loses contact with the paired Bluetooth® emitter, the firearm is disabled. For example, if the signal strength of the Bluetooth® emitter drops below a desired threshold, the firearm is disabled.

In another embodiment, remotely located emitters, send a coded message to the communications circuitry on the firearm, that when received by the firearm, controls the use of the firearm. For example, in instances remote emitters can be placed in public locations that disable the use of the firearm by transmitting a message to the communications circuitry in the firearm.

Ammunitions

In yet another embodiment, the above-described concepts including the Bluetooth® pairing, location circuitry and/or communications circuitry can be embedded within the ammunitions of a firearm to disable the triggering of the ammunitions. For example, the location circuitry and/or communications circuitry can be embedded within the chamber of a bullet to inhibit or enable the use of the bullet.

Exemplary System for Implementing Firearm Control

FIG. 1 illustrates a system 100 for controlling the use of firearms based on location of a firearm. As explained above, the system 100 can be a part of a firearm. The system 100 may include location circuitry 110 and/or communications circuitry 120. Depending on the embodiment, the location circuitry 110 and the communications circuitry 120 may be the same, or may be a part of the same circuit. For example, a circuit can perform the functions of both the location circuitry 110 and the communications circuitry 120. Depending on the embodiment, the system 100 may include additional, fewer, and/or different components.

The location circuitry 110 can be configured to determine the location of the firearm associated with the system 100. For example, the location circuitry 110 can detect the location of the firearm using Global Positioning System (GPS) technology, Local Positioning System (LPS) technology, cellular technology, Wi-Fi technology, etc. In some embodiments, the location circuitry 110 includes a GPS unit 130. The GPS unit 130 can detect the location of the firearm. The location can include geographic coordinates (e.g., latitude, longitude, elevation, etc.). The GPS unit 130 may include memory 135. The memory 135 may store information relating to locations or areas where the firearm is allowed to operate and/or not allowed to operate.

The communications circuitry 120 can be configured to communicate location information and other information associated with a firearm. The system 100 may communicate with one or more remote servers 150. For example, the system 100 may communicate the location information and other information associated with a firearm to a remote server 150. The remote server 150 may be configured to communicate with the system 100 of a firearm. The remote server 150 can receive location information from the system 100 and determine whether the firearm associated with the system 100 is in an unauthorized location or area. The remote server 150 can also determine whether the firearm is in an authorized location or area.

The remote server 150 can include a location database 155. The location database 155 can include information relating to locations where firearms are not authorized and/or locations where firearms are authorized. For instance, use of firearms may be prohibited near schools, public buildings, airports, government buildings, etc. In some cases, use of firearms may be allowed in a specific location or area, such as a shooting range. The information in the location database 155 may be updated as appropriate (e.g., periodically). The location may be defined as a geographical area. In one embodiment, the geographical area is defined as a perimeter or a radius around a specific building(s). The geographical area may be defined by one or more geographic coordinates.

The remote server 150 may determine whether to disable a particular firearm based on the location information of the firearm. For example, the remote server 150 can compare the location transmitted by the system 100 to the location information in the location database 155 to determine if the location is an unauthorized location or within an unauthorized area. If the location is an unauthorized location or area, such as a school, the remote server 150 can generate a command to disable the firearm associated with the system 100. Upon receiving the disable command from the remote server 150, the system 100 can disable the firearm from operating. For example, the communications circuitry 120 can receive the disable command and trigger the disabling of the firearm.

In some embodiments, the system 100 may receive unauthorized and/or authorized location information from the remote server 150 and store the information. For example, the memory 135 of the GPS unit 130 can store the location information received from the remote server 150. The system 100 may determine whether the location of the firearm detected by the GPS unit 130 is within any unauthorized and/or authorized location or area as defined by the location information stored in the memory 135. In one embodiment, the system 100 may store location information relating to a surrounding area of the current location of the firearm. The system 100 can receive updated location information from the remote server 150 (e.g., periodically).

Various mechanisms and/or methods may be used to disable the firearm. For example, the firearm can be disabled by disabling the hammer and/or the rebound slider of the firearm. In some embodiments, firearm disabling mechanism as described in U.S. Pat. No. 6,463,689, filed Mar. 15, 2002, entitled "GUN DISABLING MECHANISM," which is incorporated by reference herein in its entirety, can be used to disable the firearm. The communications circuitry 120 can be configured to actuate the disabling of the firearm, or may trigger another component in the system 100 to disable the firearm. In one example, a component that can mechanically disable the firearm may be connected to the communications circuitry 120, and the communications circuitry 120 can control the component based on the determination of whether to disable the firearm or not.

In addition to or prior to disabling the firearm, the system 100 may send a notification to one or more relevant persons or organizations. For example, the system 100 can send a notification that the firearm is in an unauthorized area to the owner of the firearm and/or to law enforcement agencies.

FIGS. 2A and 2B illustrate different embodiments of a firearm 250 that includes a system 200 for controlling the use of firearms. FIG. 2A illustrates an embodiment of a firearm 250a in which the system 200 for controlling the use of the firearm 250a is included within the firearm 250a. FIG. 2B illustrates another embodiment of a firearm 250b in which the system 200 for controlling the use of the firearm 250b is outside the firearm 250b. The system 200 in FIGS. 2A and 2B can be similar to the system 100 in FIG. 1.

In the example of FIG. 2A, the system 200 is included or embedded within the firearm 250a. For example, the system 200 is included as a component of the firearm 250a at the time of manufacture. In the example of FIG. 2B, the system 200 can be installed onto or into a firearm 250b. For example, the system 200 can be installed on a firearm that does not have an internal system 200, such that firearms manufactured without a system 200 can also be tracked and disabled as appropriate. The system 200 can be securely installed so that it cannot be removed by the person using the firearm 250b.

FIG. 3 illustrates a flowchart of a routine 300 for controlling the use of a firearm, according to certain embodiments. The routine 300 is described with respect to the system 100 of FIG. 1. However, one or more of the steps of the routine 300 may be implemented by other systems, such as the system 200 described in FIGS. 2A and 2B. The routine 300 can be implemented by any one of, or a combination of, the components of the system 100 (e.g., the location circuitry 110, communications circuitry 120, etc.). Further details regarding certain aspects of at least some of steps of the routine 300 are described in greater detail above, for example, with reference to FIGS. 1, 2A, and 2B.

At block 301, the system 100 communicates information relating to the location of a firearm. As explained above, the system 100 can include location circuitry 110. In one embodiment, the location circuitry 110 includes a Global Positioning System (GPS) unit, and the GPS unit determines the location of the firearm. For example, the GPS unit can detect the location of the firearm by using signals or messages received from GPS satellites. A GPS satellite may continuously transmit messages that include the time the message was transmitted and the satellite position at the time of message transmission. The GPS unit can calculate the position of the firearm based on the information received from the GPS satellites.

The system 100 can also include communications circuitry 120. The communications circuitry 120 can send the location detected by the location circuitry 110 and any other information to one or more remote servers 150. A remote server 150 can include information relating to one or more locations at which the firearm should be disabled. The one or more locations at which the firearm should be disabled may be a geographical area in which the firearm cannot be used. In some embodiments, the geographical area is a perimeter around a building. The geographical area can have different shapes depending on the characteristics of the area. In certain embodiments, the location circuitry 110 and the communications circuitry 120 are the same.

At block 302, the system 100 determines whether the firearm should be disabled based on the location of the firearm. In some embodiments, the remote server 150 may determine whether the firearm is at an unauthorized location or in an unauthorized area. For example, the remote server 150 can determine whether the location of the firearm is a location at which the firearm should be disabled based at least in part on the information relating to one or more locations at which the firearm should be disabled. After determining that the firearm is at a location at which it should be disabled, the remote server 150 can generate a command to disable the firearm and send it to the system 100. Then, the system 100 can disable the firearm from operating.

In certain embodiments, the system 100 receives information relating to one or more locations at which the firearm should be disabled from the remote server 150, and determines whether the location of the firearm is a location at which the firearm should be disabled based at least in part on the information relating to one or-more locations at which the firearm should be disabled.

At block 303, if the system 100 determines that the firearm should be disabled, the system 100 disables firearm from operating. As explained above, various disabling mechanisms can be used to disable the firearm. The communications circuitry 120 or another component in the system 100 can initiate the disabling of the firearm. In response to determining that the location of the firearm is a location at which the firearm should be disabled, the system 100 can send a notification that the firearm is at a location at which the firearm should be disabled, for example, to the owner of the firearm. Once the firearm is no longer in an unauthorized location or area, the firearm may be enabled to operate.

In some instances, the system 100 may not be able to disable the firearm properly, for example, if the battery power for the system 100 runs out or connection to the remote server 150 is lost. In such cases, the system 100 may automatically disable the firearm in order to prevent the firearm from being used in an unauthorized area.

The routine 300 can include fewer, more, or different blocks than those illustrated in FIG. 3 without departing from the spirit and scope of the description. Moreover, it will be appreciated by those skilled in the art and others that some or all of the functions described in this disclosure may be embodied in software executed by one or more processors of the disclosed components and/or mobile communication devices. The software may be persistently stored in any type of non-volatile storage.

FIG. 4 illustrates a diagram of an electronic fence 470 for controlling the use of a firearm 450, according to certain embodiments. The system 400 can be similar to the system 100, 200 of FIGS. 1, 2A, and 2B. For example, the system 400 can include location circuitry, communications circuitry, etc. Some of the details relating to FIG. 4 are described in greater detail above, for example, with reference to FIGS. 1, 2A, 2B, and 3.

The location information in the location database 155 of the remote server 155 can define an electronic fence 470 in which firearms may not be used. In the example of FIG. 4, the electronic fence 470 is an area around a building 460, such as a school, mall, etc. The electronic fence 470 may have a geometric shape (e.g., square, rectangular, circular, oval) or may be arbitrary or irregular, etc. The shape of the electronic fence 470 can depend on the characteristics of an unauthorized area. For example, the boundary around a school may not fit into a geometric shape, but may be defined by multiple geographic coordinates.

In the example of FIG. 4, the firearm 450 is initially at location 451a at which the firearm is allowed to operate. The firearm 450 includes a system 400 that controls the use of the firearm 450. The electronic fence 470 has a square shape, and is defined as a perimeter around a school building 460. The use of a firearm 450 is not authorized within this area. The system 400 communicates its position to a remote server continuously (e.g., at a predetermined interval). Then, the firearm moves to location 451b, which is within the electronic fence 470 around the school 460. The system 400 communicates its position at location 451b to the remote server, and remote server detects that the firearm 450 is within the electronic fence 470 around the school 460. The remote server can determine that the firearm 450 is within the electronic fence 470 by referring to the information about unauthorized areas in its database and checking whether any unauthorized areas include the current position of the firearm 450.

Because the firearm 450 is at a location where it should not be operable, the remote server sends a message or command that the firearm 450 should be disabled. The system 400 receives the message or command from the remote server and disables the firearm 450. Once the firearm 450 moves outside the electronic fence 470 and is not within another unauthorized area, the remote server may send a message or command to the system 400 to enable the firearm 450. In certain embodiments, the electronic fence 470 may define an area in which firearms can be used, such as a shooting range, military training facilities, etc. The firearm may be enabled in these authorized areas and disabled at other times.

In this manner, firearms may be used more safely, and use in unauthorized areas can be prevented. In addition, the information relating to unauthorized areas can be updated as appropriate (e.g., in real-time, periodically, etc.) in response to any changes to current information or to add information relating to any new unauthorized areas.

Conclusion

The concepts disclosed herein are not limited to newly manufactured firearms, but also can be applied to existing firearms by retro-fitting existing firearms with the components described above.

The various illustrative processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, hard disk, a removable disk, a CD-ROM, memory capable of storing firmware, or any other form of computer-readable storage medium known in the art. An exemplary computer-readable storage medium can be coupled to a processor such that the processor can read information from, and write information to, the computer-readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out all together. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A method of controlling use of firearms, the method comprising:
    pairing a firearm with a local wireless network device associated with a registered owner of the firearm, wherein circuitry in the firearm performs the pairing with the local wireless network device associated with the registered owner of the firearm, wherein when the local wireless network device loses contact with the circuitry in the firearm, the circuitry is configured to disable the firearm;
    receiving at the circuitry in the firearm, one or more messages from remote emitters placed in one or more of a plurality of locations, wherein the remote emitters transmit one or more disable messages that direct the circuitry to disable the firearm, wherein the remote emitters are placed in public locations, and wherein disabling the firearm with the disable messages from the remote emitters is in addition to disabling the firearm when the local wireless network device associated with the registered owner loses contact with the circuitry in the firearm;
    sending location information with the circuitry in the firearm to a remote server, wherein the remote server stores a plurality of coordinates that form electronic fences that define perimeters around one or more of the plurality of locations at which the firearm should be disabled, and wherein sending the location information is in addition to receiving messages from the remote emitters and in addition to losing contact with the paired local wireless network device;
    determining with a Global Positioning System (GPS) unit associated with the firearm, coordinates of a current location of the firearm, wherein the GPS unit in communication with the circuitry located in the firearm;
    sending to the remote server with the circuitry in the firearm the coordinates of the current location of the firearm;
    comparing at the remote server, the current location of the firearm with the electronic fences stored in the remote server to determine whether the firearm has entered one of the perimeters in which the firearm should be disabled;
    sending from the remote server to the circuitry in the firearm a disable indication that directs the circuitry to disable the firearm when the firearm has entered one of the electronic fences in which the firearm should be disabled, or an enable indication that directs the circuitry to enable the firearm when the firearm has exited one of the electronic fences in which the firearm should be disabled;
    wherein prior to disabling the firearm, the circuitry in the remote server sends a notification to an owner of the firearm about the location of the firearm when the firearm leaves one of the electronic fences;
    sending from the remote server to the circuitry in the firearm, a disable indication that directs the circuitry to disable the firearm when the firearm is reported lost or stolen;
    wherein the circuitry in the firearm mechanically disables the firearm in response to:
        when the local wireless network device associated with the registered owner loses contact with the circuitry in the firearm,
        when one or more one or more disable messages are received at the circuitry in the firearm from the remote emitters,
        when the disable indication from the remote server is sent to the circuitry in the firearm, and
        when the circuitry in the firearm loses connection with the remote server; and
    wherein the circuitry in the firearm mechanically re-enables the firearm when the local wireless network device is in contact with the circuitry in the firearm, when the one or more disable messages are not received at the circuitry in the firearm from the remote emitters, when the circuitry in the firearm is connected with the remote server, and when the enable indication from the remote server is sent to the circuitry in the firearm.

2. The method of claim 1, wherein the electronic fence comprises a geographical area in which the firearm should be disabled, wherein the geographical area is defined as a radius or a perimeter around specific coordinates associated with a location, or wherein the geographical area is defined by two or more sets of coordinates, each set of coordinates corresponding to a location.

3. The method of claim 1, further comprising:
    subsequent to the disabling of the firearm:
        determining, using the GPS unit, coordinates of a location of the firearm at a second time subsequent to disabling of the firearm;
        transmitting the coordinates of the location of the firearm at the second time to the remote server;
        receiving from the remote server second information relating to whether the firearm should be disabled at the coordinates of the location of the firearm at the second time; and
        in response to determining that the firearm should not be disabled based on the second information from the remote server, initiating enabling of the firearm.

4. The method of claim 1, wherein the coordinates of the current location of the firearm comprise a latitude, a longitude, and an elevation of the current location of the firearm.

5. The method of claim 1, further comprising, in response to said determining that the firearm should be disabled, sending a notification that the firearm is at a location at which the firearm should be disabled.

6. The method of claim 1, wherein one or more of the electronic fences have an irregular shape.

7. The method of claim 1, wherein the remote server sends the plurality of coordinates that form one or more of the electronic fences to the circuitry in the firearm for storage in the firearm.

8. The method of claim 7, wherein the circuitry in the firearm further disables the firearm when the firearm enters one of the electronic fences stored in the firearm.

9. The method of claim 1 wherein the local wireless network device is implanted in the body of the registered user of the firearm.

10. A system for controlling use of firearms, the system comprising:
a remote server that stores a plurality of coordinates that form electronic fences that define perimeters around one or more of a plurality of locations at which a firearm should be disabled; and
a firearm comprising circuitry that mechanically disables and enables the firearm, the circuitry configured to:
pair the firearm with a local wireless network device associated with a registered owner of the firearm, wherein circuitry in the firearm performs the pairing with the local wireless network device associated with the registered owner of the firearm, wherein when the local wireless network device loses contact with the circuitry in the firearm, the circuitry is configured to disable the firearm;
receive at the circuitry in the firearm one or more messages from remote emitters placed in one or more of a plurality of locations, wherein the remote emitters transmit one or more disable messages that direct the circuitry to disable the firearm, wherein the remote emitters are placed in public locations, and wherein disabling the firearm with the disable messages from the remote emitters is in addition to disabling the firearm when the local wireless network device associated with the registered owner loses contact with the circuitry in the firearm;
send location information with the circuitry in the firearm to the remote server, wherein sending the location information is in addition to receiving messages from the remote emitters and in addition to losing contact with the paired device Bluetooth device;
determine with a Global Positioning System (GPS) unit associated with the firearm, coordinates of a current location of the firearm, wherein the GPS unit in communication with the circuitry located in the firearm;
send to the remote server the coordinates of the current location of the firearm;
the remote server is further configured to compare the current location of the firearm with the electronic fences stored in the remote server to determine whether the firearm has entered one of the perimeters in which the firearm should be disabled;
the remote server is further configured to send to the circuitry in the firearm a disable indication that directs the circuitry to disable the firearm when the firearm has entered one of the electronic fences in which the firearm should be disabled, or an enable indication that directs the circuitry to enable the firearm when the firearm has exited one of the electronic fences in which the firearm should be disabled;
the remote server is further configured to send a notification to an owner of the firearm about the location of the firearm when the firearm leaves one of the electronic fences prior to disabling the firearm;
the remote server is further configured to send a disable indication that directs the circuitry to disable the firearm when the firearm is reported lost or stolen;
the circuitry in the firearm is further configured to mechanically disable the firearm in response to one of the group consisting of:
when the local wireless network device associated with the registered owner loses contact with the circuitry in the firearm,
when one or more one or more disable messages are received at the circuitry in the firearm from the remote emitters,
when the disable indication from the remote server is sent to the circuitry in the firearm, and
when the circuitry in the firearm loses connection with the remote server; and
the circuitry in the firearm further configured to mechanically re-enable the firearm when the local wireless network device is in contact with the circuitry in the firearm, when the one or more disable messages are not received at the circuitry in the firearm from the remote emitters, when the circuitry in the firearm is connected with the remote server, and when the enable indication from the remote server is sent to the circuitry in the firearm.

11. The system of claim 10 wherein the coordinates of the current location of the firearm comprise a latitude, a longitude, and an elevation of the current location of the firearm.

12. The system of claim 10 wherein the electronic circuitry in response to said determining that the firearm should be disabled, sending a notification that the firearm is at a location at which the firearm should be disabled.

13. The system of claim 10 wherein one or more of the electronic fences have an irregular shape.

14. The system of claim 10 wherein the remote server sends the plurality of coordinates that form one or more of the electronic fences to the circuitry in the firearm for storage in the firearm.

15. The system of claim 14 wherein the circuitry in the firearm further disables the firearm when the firearm enters one of the electronic fences stored in the firearm.

16. The system of claim 10 wherein the local wireless network device is implanted in the body of the registered user of the firearm.

* * * * *